United States Patent [19]
Prange

[11] 3,855,663
[45] Dec. 24, 1974

[54] WIPING AND WASHING DEVICE FOR GLASS SURFACES, THOSE OF VEHICLES IN PARTICULAR

[75] Inventor: Horst Prange, Planegg, Germany

[73] Assignee: Con-Technik GmbH, Worthsee, Germany

[22] Filed: Jan. 18, 1973

[21] Appl. No.: 324,587

[52] U.S. Cl......... 15/250.04, 15/250.15, 15/250.18, 15/250.29
[51] Int. Cl. ............................................. B60s 1/46
[58] Field of Search....... 15/250.04, 250.15, 250.18, 15/250.2, 250.29, 250.35; 350/61

[56] References Cited
UNITED STATES PATENTS

| | | | |
|---|---|---|---|
| 1,795,964 | 3/1931 | O'Connor | 15/250.04 |
| 3,158,935 | 12/1964 | Rosenthal | 15/250.29 X |
| 3,371,368 | 3/1968 | Walker | 15/250.04 |

FOREIGN PATENTS OR APPLICATIONS

| 1,933,939 | 1/1971 | Germany | 15/250.04 |
|---|---|---|---|

Primary Examiner—Peter Feldman
Attorney, Agent, or Firm—Ostrolenk, Faber, Gerb & Soffen

[57] ABSTRACT

Wiping and washing device for glass surfaces, particularly on vehicles or the like, comprising a slide across the glass surface and a wiper in contact with the glass surface; the wiper moves along the slide across the glass surface; spring means for rapidly returning the wiper to its initial position; washing agent canals in the slide for transmitting washing agent pumped from a supply onto the glass surface.

12 Claims, 4 Drawing Figures

Fig. 1
Fig. 2
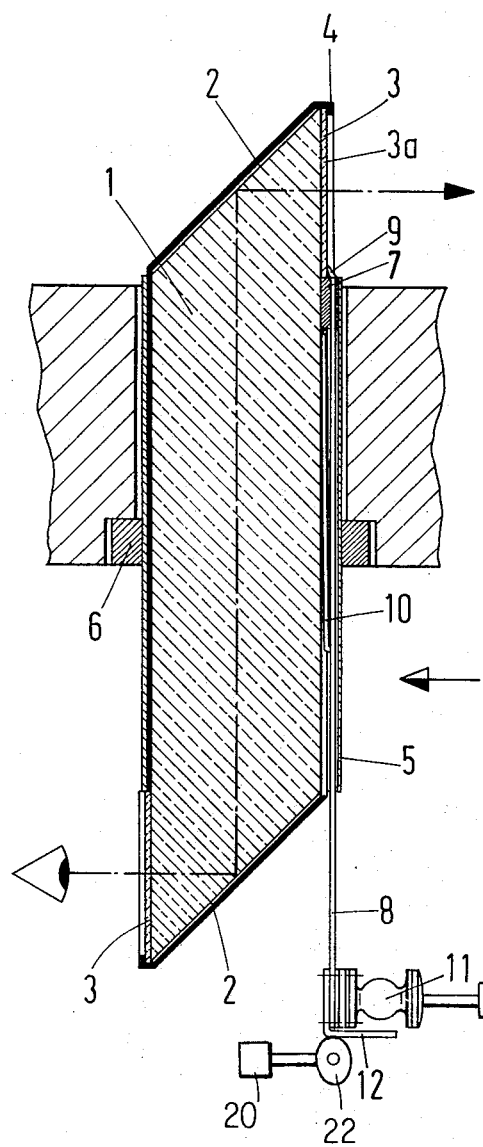
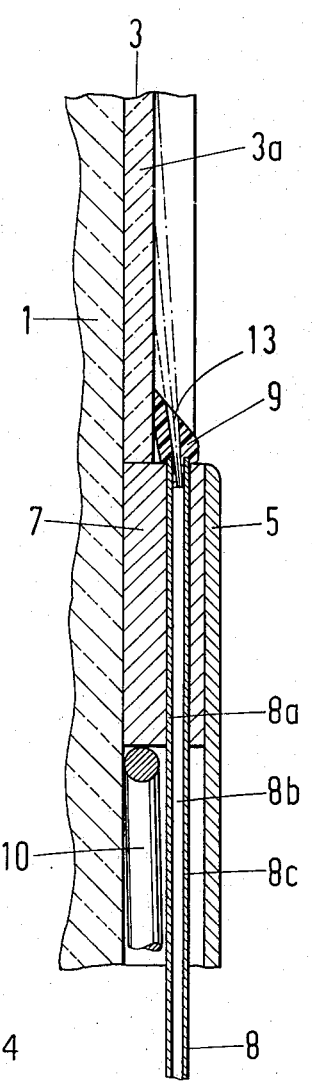

WIPING AND WASHING DEVICE FOR GLASS SURFACES, THOSE OF VEHICLES IN PARTICULAR

This invention concerns a wiping and washing device for glass surfaces, particularly those in vehicles.

Known wiping and washing devices for glass surfaces, vehicles, or the like, do not satisfy every requirement. For example, it is difficult to modify known wiping and washing devices for cleaning the headlight surfaces of a vehicle in motion since the space available for fixing such a device is very limited, particularly in the longitudinal direction of a vehicle. Similar difficulties exist with periscopes of tanks and other armored vehicles because the periscopes have a very small exposed glass surface that must be cleaned.

Wiping and washing devices are needed which either do not at all, or only minimally, reduce this sighting-surface during the cleaning process. Furthermore, due to the restricted space available, it is desirable that the space required by the wiping and washing device be very small.

The object of the invention is to provide a wiping and washing device for glass surfaces on vehicles which needs little space in the direction perpendicular to the plane of the glass surface and which is simple and safe in operation.

According to the present invention, the wiping and washing device comprises a wiper fixed to a slide that runs parallel to the plane of the glass surface. The wiper can be moved in a linear motion across the glass surface to be cleaned and is connected via canals with a source providing a washing agent.

It is advantageous if this slide is comprised of three plates rigidly connected with each other, e.g., by being glued together. The middle and thicker plate contains canals for bringing the washing agent from its source to the wiper. These canals may be provided, for instance, by milling grooves into the middle plate.

Furthermore, it is preferable to bias the slide and thus the wiper toward its initial position by means of a spring. During the wiping proces the slide is moved against the tension of the spring across the glass surface. It is then pushed back to its initial position, under pressure of the springs in the shortest time possible. With a periscope, the slide may be moved across the glass surface against the tension of the spring in a simple manner, e.g., by hand, or by a motor drive, with an eccentric or cam disk, for instance, which runs the slide across the glass surface.

At its end opposite the wiper, the slide may be provided with a pumping device for bringing the washing agent through the canals to the wiper. This pump may, for instance, be a simple rubber bellows pump or an electric pump.

Furthermore, it is of advantage if the plates that comprise the slide are of transparent material so that the wiping process causes only a slight reduction of the glass surface transparency.

On the other hand, the plates that comprise the slide may be of opaque material so as to produce the following effect. By a simple locking device at the lower end of the slide, when the slide is in its working position, i.e., when the wiper has reached the end of its forward movement, a total darkening (blackout) of the armored vehicle is effected to that no stray light is transmitted from the interior of the vehicle to the outside, especially at night. This means that any optical orientation and location possibility is avoided.

The construction according to the invention of the wiping and washing device results in a flat, space-saving set-up which permits the lodging of the wiping and washing device even in very restricted areas. It is possible, for instance, to build the wiping and washing device directly into the casing of a periscope on a tank or other armored car in a sealed manner so that the demands made upon such periscopes will not injure the wiping and washing device. Moreover, the dimensions of such periscopes need not be altered for the purpose of building in a wiping and washing device according to the invention.

In addition, by lodging the wiping and washing device in the periscope of a tank or armored car, the usual sealing of the periscope by a sealing-frame is not impaired. Furthermore, the wiping and washing device as a one-piece unit is connected with the periscope in such a manner that any additional exterior parts are superfluous.

Moreover, the wiping and washing device according to the invention provides the advantage of covering the glass surface to be cleaned during the wiping process so that no dirt is caught between the contact area of the wiper and the surface to be cleaned while the wiper is returning to its initial position. With a conventional arrangement, where the wiper is guided by rods or similar means, there is the risk that dirt will accumulate at the contact area of wiper and surface to be cleaned because fresh dirt is getting onto the glass surface with the wiper farthest removed from its initial position. Contrary to the intended direction of the wiping, this dirt is then taken along when the wiper returns to its initial position, and the dirt accumulates between the contact area of the wiper and the surface to be cleaned. By employing a slide which completely covers the glass surface to be cleaned during the wiping process, dirt is prevented from getting to the glass surface during the wiping process and thus neither an accumulation of dirt nor an impediment of the wiper movement will occur.

The fact that the slide is guiding the wiper in a sealing-frame results in a perfect sealing of the perioscope or of any other optical arrangement such as headlights, for instance, so that gases and humidity cannot penetrate the arrangement.

In the following the invention is explained in detail by means of drawings showing the execution of a wiping and washing device for periscopes of tanks and other armored cars according to the invention.

IN THE DRAWINGS

FIG. 1 shows a cross-section of a built-in periscope with the wiping and washing device according to the invention.

FIG. 2 is an enlarged detail of FIG. 1, offering a more explicit view of the build-up of the wiping and washing device

Figure 3:
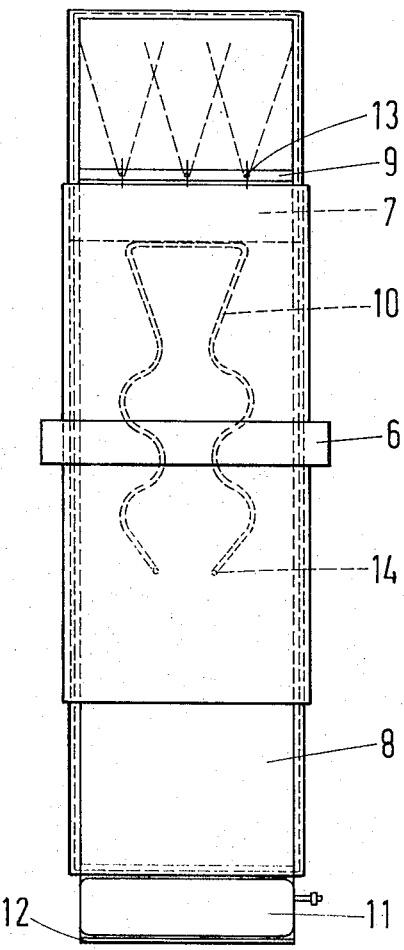
FIG. 3 is a view in the direction of the arrows III—III of FIG. 1.

In FIG. 1, a cross-section is shown of a built-in tank periscope with the wiping and washing device according to the invention. The periscope comprises a basic element 1, with two reflecting mirrors 2 and protective plates 3, all of which are built into a shock-resisting casing 4. Protective housing 4 has a stay bar 6 by which the periscope is fastened in an opening bored through a horizontal armored area of the tank. The outer protective plate 3a becomes easily covered by dirt when the tank is negotiating difficult ground, is in a column, or during spells of bad or very dry weather. For this reason, the wiping and washing device according to the invention has been arranged in front of this protective plate.

The wiping and washing device is comprised of a wiper 9, made of plastics, for instance, which is attached to the upper end of a slide 8. This slide moves within the protective housing of the periscope so that the outer dimensions of the periscope need not be altered. Tension spring 10 holds wiper 9 and slide 8 under pressure in their initial position, with the wiper resting at the lower edge of protective plate 3a.

A handle 12 for operating the slide against the tension of the spring and a bellows pump for pumping the washing agent to the wiper may be provided at the side of the slide 8 opposite the wiper 9.

Details of the wiping and washing device according to the invention may be understood from FIG. 2, showing a detail of FIG. 1 covering the protective plate 3a. The slide is comprised of three plates 8a, 8b and 8c. The middle and thicker plate 8b contains canals produced by milling, for instance, for feeding the washing agent through the slide to the wiper. The three plates 8a, 8b and 8c may in a suitable manner, by glueing, for instance, be joined to each other and connected with the wiper 9. As can be seen from FIG. 2, the wiper 9 contains canals 13 for bringing the washing agent to the protective plate 3a. These canals 13 run toward the protective plate 3a at an oblique angle. The slide is being run below the protective plate in a sealing frame 7 within the casing 5 of the periscope. A spring 10 arranged below the sealing frame effects a speedy return of the slide 8 to its initial position represented in FIG. 2.

FIG. 3 shows a top view of the arrangement of FIG. 1 in the direction of the arrows III—III. It further shows that several canals 13 are distributed over the length of the wiper 9, through which canals a washing agent may be sprayed on to the protective plate 3a. Spring 10 is connected with the slide 8 at point 14, and with its opposite end, it stays at the underside of the sealing frame 7. At the lower end of the slide 8 a bellows pump 11 is provided. It has a handle 12 which enables the feeding of a washing agent to the wiper 9.

Figure 4:
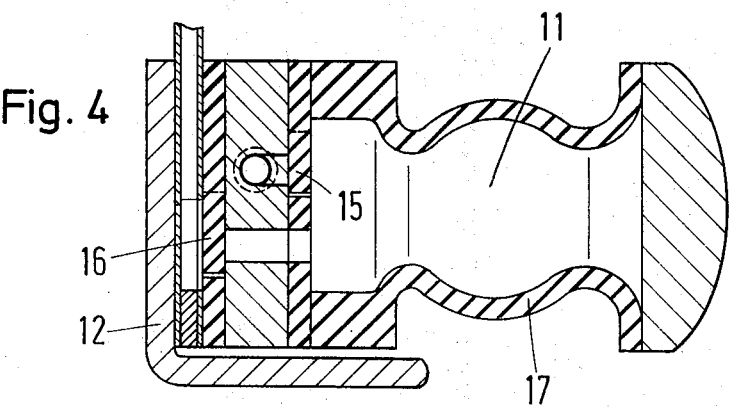
FIG. 4 shows a pump for pumping a washing agent, which is hand-operated.

In FIG. 4, the bellows pump comprises a rubber bellows 17 connected with a valve system with two rubber leaves 15 and 16 which control the pumping. This bellows pump is executed in the usual manner so that superfluous. more detailed description of its construction is superfluousl It is possible to control the slide 8 by an electric motor 20 via an eccentric disk or a cam disk 22, for instance; and the pump 11 can be replaced by an electric motor-driven pump 24. It is possible to replace the pumps for several periscopes by a single central pumping unit and to have a single container for the washing agent.

I claim:

1. Wiping device for a glass, or the like material, surface on a vehicle or the like, wherein the surface has a predetermined length between two ends thereof and the surface has a predetermined width;

said device comprising:

a slide for supporting a wiper and also for covering the surface to be wiped; said slide having a length of at least said predetermined length; said slide having a width along its entire length of at least said predetermined width of the surface; said slide being generally parallel to the surface when it covers the surface; said slide being impervious to passage therethrough of water and dirt;

said slide having a leading edge which is movable across the surface from one end of the surface, at which the slide does not cover the surface, across the length of the surface to the opposite ends of the surface, at which the slide covers the surface and blocks passage of materials through the slide to the surface; means for moving said slide across the length of the surface;

a wiper for said surface carried on said slide and being located in the vicinity of said slide leading edge and being movable with said slide across the surface.

2. Wiping device of claim 1, further comprising motor means connected to said slide for selectively moving said slide and said wiper thereon across the length of the surface between the ends of the surface.

3. Wiping device of claim 1, further comprising a guide and sealing frame positioned in front of the surface to be wiped and which is of a size and so positioned and shaped to engage the width sides of said slide as said slide moves lengthwise of the surface.

4. Wiping device of claim 1, further comprising:

a washing device; said washing device comprising at least one canal passing through said slide and having an exit in the vicinity of said wiper and said canal exit being oriented to dispense a washing agent onto the surface in the vicinity of said wiper; means connecting said canal to a source of washing agent, which washing agent moves through said canal to said canal exit.

5. Wiping device of claim 4, further comprising a pumping device connected to said canal for pumping washing agent therethrough to said canal exit.

6. Wiping device of claim 4 wherein said canals are milled into said central plate.

7. Wiping device of claim 1, wherein a spring is connected to said slide to retain said slide and said wiper under tension in their initial position at which said wiper is lying at said one end of the surface to be wiped.

8. Wiping and washing device of claim 5, wherein said pumping device is a bellows pump.

9. Wiping and washing device of claim 5, wherein said pumping device is an electric pump.

10. Wiping and washing device of claim 1, wherein said slide can be moved by hand across the glass surface.

11. Wiping device of claim 4, wherein said plates forming said slide are comprised of a transparent material.

12. A wiping and washing device for a glass or the like surface on a vehicle or the like, comprising:

a slide oriented generally parallel to the surface and located in front of the surface;

a wiper attached to and carried on said slide and being movable with said slide across the surface in a linear motion;

means for moving said slide and the attached said wiper linearly across the surface to be wiped;

said slide having a washing device; said washing device comprising at least one canal passing through said slide and having an exit in the vicinity of said wiper and said canal exit being oriented to dispense a washing agent onto the surface in the vicinity of said wiper; means connecting said canal to a source of washing agent, which washing agent moves through said canal to said canal exit;

wherein said slide is comprised of three lengthwise entending plates oriented to extend across the surface and all adjoined to form a solid three layered slide assembly;

said at least one canal being formed in and passing through the central plate of said slide.

* * * * *